Oct. 26, 1965   E. P. WARNERY   3,214,225
THREE-POINT-CONTACT ANTIFRICTION BEARING
Filed May 9, 1963   3 Sheets-Sheet 3

EDMOND P. WARNERY
INVENTOR.

BY Karl F. Ross

AGENT

United States Patent Office 3,214,225
Patented Oct. 26, 1965

3,214,225
THREE-POINT-CONTACT ANTIFRICTION
BEARING
Edmond P. Warnery, Boulogne-sur-Seine (Seine), France, assignor to Compagnie Francaise Thomson-Houston, Paris, France, a corporation of France
Filed May 9, 1963, Ser. No. 279,066
Claims priority, application France, May 9, 1962, 897,002, Patent 1,330,269
9 Claims. (Cl. 308—177)

This invention relates to antifriction bearing devices of the type in which the antifriction bearing has one of its races, e.g. the inner race, firmly engaging a rotatable member, e.g. a shaft, to be supported by the bearing and its opposite race, e.g. the outer one, engaging a supporting structure or frame by way of three pressure-transmitting areas or portions, usually spaced 120° apart around the axis of the bearing, at least one of these portions being radially displaceable for a limited extent and resiliently biased against said opposite race of the bearing.

Bearing devices of this type, herein called three-point-contact bearings, have important advantages including especially a virtual elimination of unwanted radial clearance, high accuracy in the determination of the geometrical center of rotation of the rotatable member, and allowance for thermal expansion and contraction of the parts without affecting the operation of the device.

However, conventional three-point-contact bearing devices have been found to possess certain practical disadvantages, especially in connection with precision applications such as servo-mechanisms for delicate instruments. The radially displaceable pressure-transmitting portion, usually provided in the form of a spring-biased plunger, requires a relatively large additional amount of radial space for its mounting, which often raises mechanical or structural problems especially in the case of miniature servo-equipment. Also, the spring pressure applied to the plunger is not readily adjustable. Moreover, the forces that tend to be set up and applied to the individual anti-friction elements, such as needles, of the bearing are apt to be non-uniform during rotation of the bearing, so that the needles tend to be displaced from their correct positions and to become angled with respect to the axis of the bearing, thereby creating reaction forces from their guiding means, so that considerable friction is produced and the smooth operation of the bearing is impaired.

Objects of this invention are to provide improved antifriction bearing means especially useful in high-precision mechanisms, such as servo-mechanisms for fine instruments, and possessing extremely low friction and high performance accuracy under all operating conditions including very low angular velocities of the rotatable member to be supported; to provide a three-point-contact bearing in which all radial dimensions may be greatly reduced as compared to conventional devices of this type; to facilitate control and adjustment of the pressure under which the radially displaceable pressure-transmitting part is applied against the bearing race; to provide for a more uniform transmission of pressures to and from the bearing; to improve the mode of retention of the antifriction elements, such as needles, and to minimize undesirable displacement and angling thereof from their prescribed positions. Other objects will become apparent from the description to follow.

According to an important aspect of the invention, an improved three-point-contact antifriction device of the type defined earlier herein is characterized in that the pressure-transmitting part associated with the bearing is in the form of a radially displaceable shoe having one surface engaging said opposite race of the bearing, means being provided for applying fluid pressure to an opposed surface of said shoe for yieldingly biasing the shoe against said opposite bearing race.

Further important aspects and features of the invention will appear as the disclosure proceeds. Exemplary embodiments of the invention will now be described by way of illustration but not of limitation with reference to the accompanying drawing wherein.

Figure 1:
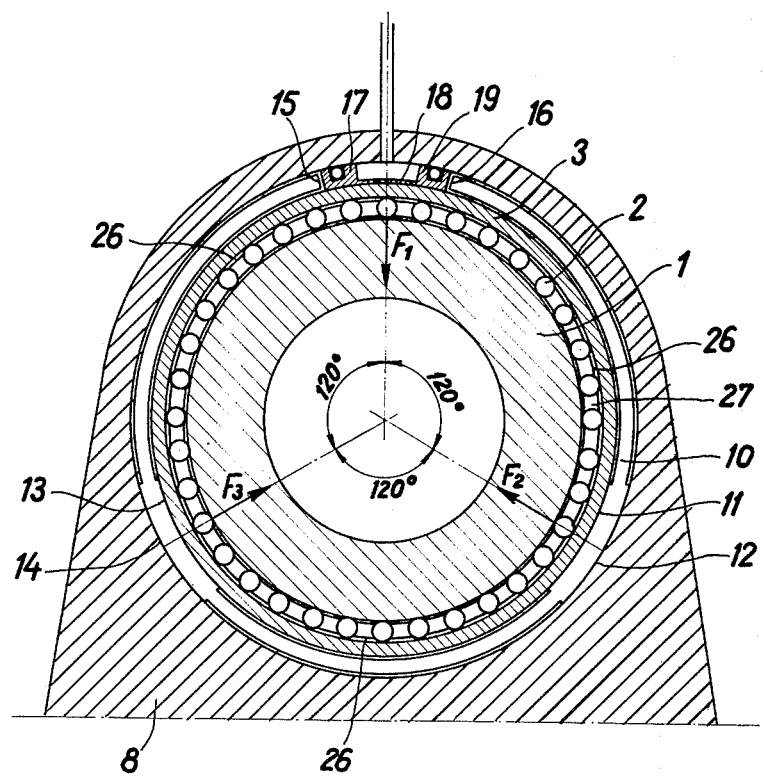
FIG. 1 is a simplified view, in cross section on a plane transverse to the bearing axis, of a three-point-contact bearing device according to the present invention.

My improved three-point-contact bearing device as shown in FIG. 1, serving to suport a rotatable shaft 1, includes a circumferential set of anti-friction elements such as needles 2, here shown as being directly seated in a peripheral groove of shaft 1 which thus constitutes the inner race of the bearing. The needles 2 are surrounded by an outer race or ring schematically shown at 3. The outer bearing race or ring is surrounded by an intermediate ring member 10 which is interrupted in one arcuate area thereof between the end points 15 and 16. The member 10 is formed in two further arcuate areas thereof, symmetrically spaced (e.g. by 120°) to either side from the interrupted area, with internal bearing surfaces 11 and 13, and corresponding external surfaces 12 and 14, providing force-transmitting portions between the race 3 and the circumferential wall of a generally cylindrical bore formed in a supporting frame 8.

Figure 2:
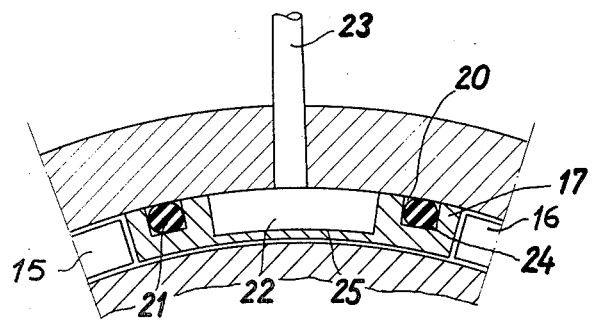
FIG. 2 is an enlargement of the upper part of FIG. 1, showing the improved hydraulically biased pressure-transmitting part or shoe.
Figure 3:
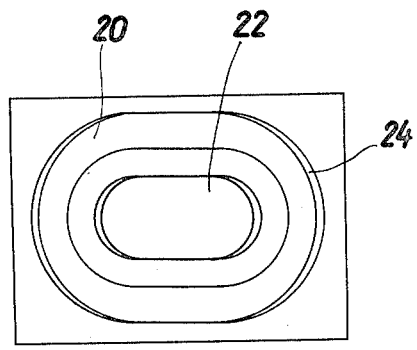
FIG. 3 is a top plan view of a part shown in FIG. 2.

Fitted between the spaced end points 15 and 16 of the interrupted ring 10 is a hydraulic force-transmitting part or shoe 17, more clearly shown in FIGS. 2 and 3. The shoe 17 has a part-cylindrical inner surface 18 of a radius equal to that of the outer periphery of ring 3, while its radially outer surface 19 partly coincides with a cylinder congruent with the surface of the cavity in frame 8. In the said outer surface of shoe 17 is formed a depression 22 which defines a bottom wall 25 of relatively small thickness. The depression 22 may be circular, or elongated with rounded ends as shown in FIG. 3, or of other suitable shape in plan. Surrounding the depression 22 in spaced relation with it is annular groove 20 preferably of constant-depth rectangular cross section and an outline generally parallel to that of the walls of the depression, and a seal ring 21 of suitable deformable material is positioned in the groove to be compressed somewhat therein. An hydraulic conduit 23 extends through the casing 8 to open into the top center of the depression 22, being connected externally to any suitable controllable source of pressure fluid, preferably oil.

In operation, hydraulic pressure applied externally by way of duct 23 exerts a uniform pressure of selectable strength upon the contact surface 18 between the shoe 17 and the outer bearing race 3, substantially over the total area bounded by the outer wall surface 24 of the groove 20. The pressure force is transmitted to the race 3 as the force F1, and give rise to symmetrical reaction forces F2 and F3 at the stationary pressure-transmitting areas 11 and 12 so that under the combined action of the three forces F1, F2, F3 the shaft 1 will revolve in closely centered relation and without play or friction and will also be able to expand and contract in response to temperature variations without impairing this relationship.

The resulting three-point-contact bearing device according to the invention operates generally in the manner of a conventional three-point-contact bearing device embodying a spring-pressed plunger in place of the hydraulic pressure shoe. However, the hydraulic shoe 25 can be made to much smaller radial dimensions than the plunger of such conventional system with the powerful biasing spring means required therefor. This is especially true since the force of the plunger-biasing spring in the prior-art arrangement must be made great enough to ensure that the outer bearing race or ring will deform somewhat under the combined action of the spring force and the two reaction forces generated thereby, so as to take up any play that may be present around the shaft. The resulting arrangement is very cumbersome and unsuitable for miniature machinery such as instrument servo-mechanism components. The hydraulic pressure shoe 17 of the invention, being entirely contained within the annular space defined between the race 3 and the circumferential surface of the bore in the supporting frame 8, completely overcomes this serious difficulty. Moreover, the biasing pressure applied at F1 to the bearing race can be more easily controlled, held to a more nearly uniform value in operation and more easily readjusted if and when required, by simply acting on a suitable control valve, not shown, in the external oil circuit.

In the operation of conventional three-point-contact bearings, it has been found that unexpectedly high friction forces tend sometimes to arise, impairing the smooth operation of the bearing. I have determined that this common defect in primarily due to the fact that, as the needless are moving through the pressure areas such as the ones shown at 11, 13 and 18 (FIG. 1), the needles tend to be deflected from their correct positions both laterally and angularly by the pressure forces to which they are subjected. On moving on into the relatively free intermediate regions such as 26, the needles may retain their displaced positions and may enter the next pressure area still in such a displaced condition, thereby generating the high strains and friction mentioned above. In accordance with an important feature of the invention, this defect is eliminated in a way now to be described with reference to FIGS. 4 to 6.

Figure 4:
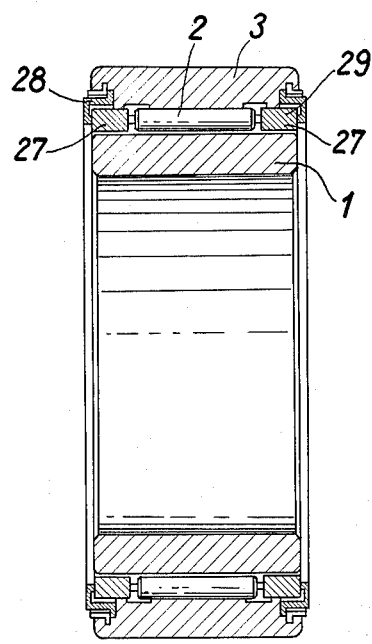
FIG. 4 is a view in axial cross section illustrating a needle cage used in the bearing of FIG. 1, in accordance with a preferred form of the invention.
Figure 5:
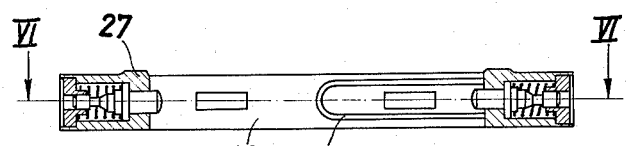
FIG. 5 is an enlarged view of the upper part of FIG. 4, representing a section on line V—V of FIG. 6, but with the needle removed from its cage recess.
Figure 6:
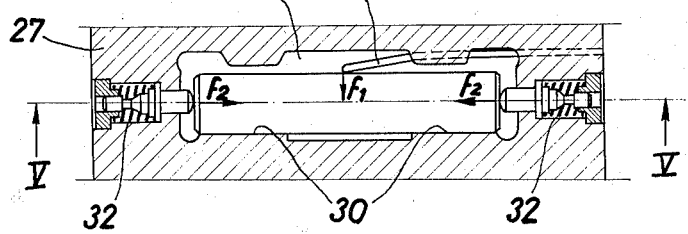
FIG. 6 is an enlarged sectional view on lines VI—VI of FIG. 5 with the needle in position.

FIG. 4 illustrates in axial cross section a preferred embodiment of a three-point-contact bearing according to the invention, including an inner race or bearing ring 1' and an outer race 3, adapted to be received within an interrupted ring such as the ring 10 of FIG. 1, not shown in FIG. 4. The needles 2 are positioned in a cage member 27 guided for rotation and retained axially in position by the opposite annular retainer flanges 28 and 29 secured to the outer race 3 at the ends of the bearing. The cage 27 may be of generally conventional type, being formed with a number of uniformly spaced elongated recesses or cutouts 33 around its circumference for freely receiving the individual needles 2 therein. Each of these recesses 33, clearly visible in FIGS. 5 and 6 is formed on one side with a carefully machined transverse reference surface 30 true and parallel to the axis of the bearing. In accordance with the invention, a first resilient means is provided to apply each needle yieldingly against this surface while permitting its being deflected therefrom by pressure forces. As shown, this first resilient means is in the form of a hairpin wire spring 31 having its parallel spaced ends inserted in suitable recesses in the cage 27 at one side, and having its looped end deflected to engage an intermediate point of the side of the needle opposite the reference surface 30.

Further resilient means are provided for axially positioning the needle 2, and are here shown as a pair of miniature spring-pressed plunger devices generally designated 32 engaging the opposite ends of the needle and mounted for limited axial sliding displacement in end cavities of the cage 27.

In operation, the first spring 31 exerts a lateral biasing force against the needle 2 as shown at f1, while the second spring means 32 exert axial forces as at f2. The springs 31 and 32 are calibrated so as to be weak enough in relation to the pressure forces normally developed in the pressure areas 11, 13, 18 to permit the needle to be displaced in all directions by said forces, while being strong enough to ensure that any needle thus displaced will be positively restored to its correctly centered and aligned position, on moving into any one of the three intermediate regions 26 wherein said pressure forces are not present. The dimensioning is such that each needle is free to be deflected in its recess in all directions to an extent somewhat greater than the maximum displacements that can be expected to be imparted thereto by the pressure forces.

It will easily be understood that with this arrangement the needles will always be sure to reenter a pressure area in their correctly centered positions, and practice has in fact shown that three-point-contact bearings provided with the resilient recentering means of the invention do not tend to exhibit the objectionable friction characteristics referred to above, but at all times operate smoothly and with extremely low frictional torques.

It will be apparent that various modifications may be introduced into the exemplary embodiments of the invention shown and described without exceeding the scope thereof. While the invention has been described with reference to an application wherein the member to be rotatably supported is engaged by the inner race of the bearing, as is the case with a rotating shaft, and the outer bearing race engages the fixed support, it is of course equally applicable to the inverse arrangement wherein the inner bearing race is fixed and the outer race is rotatable with an annular member to be supported. The modifications involved in suiting the invention to such an application are self-evident.

The three pressure-transmitting areas are not necessarily spaced 120° apart, as shown, although a symmetrical arrangement of the stationary pressure transmitting areas on opposite sides of the radially displaceable pressure element is preferred.

The features of the invention are, in part at least, applicable to ball bearings instead of the needle or roller bearings shown.

The pressure member 17 (FIG. 1), while here shown as actuated by hydraulic pressure, may conceivably be arranged for actuation by pneumatic pressure. While the resilient self-centering feature described with reference to FIGS. 4–6 is advantageously applied jointly with the fluid-pressure feature illustrated in FIGS. 1–3, the features may be used independently of one another if so desired. Various other changes and modifications may be conceived depending on the requirements of specific applications.

What I claim is:

1. The combination with a rotatable member of an antifriction bearing device for supporting said member, said device comprising a circumferential series of antifriction elements having their one sides rollingly engaging a peripheral surface of said member; a race member positioned coaxially with said member to have one surface thereof rollingly engaged by the opposite sides of said elements; supporting structure including a circumferential surface coaxial with said race member and generally radially spaced from the opposite surface thereof to define an annular space therewith; means in said annular space defining pressure-transmitting areas of limited arcuate extent from said supporting surface to said opposite surface of the race member, said areas being circumferentially spaced around said race member; a pressure member entirely contained within said annular space and mounted for limited radial displacement therein and having an inner surface engageable with said opposite surface of the race member in a further pressure-transmitting area generally symmetrically spaced with respect to said first areas;

means restraining said pressure member against circumferential displacement in said annular space; and fluid-pressure means including a pressure inlet formed in said supporting structure, means defining a pressure chamber, and means sealing said chamber from said annular space around said pressure member, said chamber communicating with said inlet and being at least partly defined by an outer surface of said pressure member for applying a selectable fluid pressure to urge said pressure member into pressure-transmitting engagement with said opposite surface of the race member in said further area.

2. The combination with a rotatable member of an antifriction bearing device for supporting said member, said device comprising a circumferential series of antifriction elements having their one sides rollingly engaging a peripheral surface of said member; a race member positioned coaxially with said member to have one surface thereof rollingly engaged by the opposite sides of all said elements; supporting structure including a circumferential surface coaxial with said race member and radially spaced from the opposite surface thereof to define an annular space therewith; an interrupted ring element interposed in the said annular space, said ring element having portions symmetrically spaced with respect to the interruption therein for transmitting pressure between said race member and supporting surface over limited arcuate areas; a pressure member mounted for limited radial displacement with said pressure member for urging the latter into pressure-transmitting engagement with said opposite surface of the race member.

3. The combination defined in claim 2, wherein said pressure member has a radially inner arcuate surface engageable with said race member, a depression formed in the radially outer surface of the pressure member for defining said pressure chamber, said pressure inlet comprising a passage formed through said circumferential supporting surface and opening generally radially into said depression, and sealing means between said radially outer surface of the pressure member and said supporting surface, surrounding the sides of said depression.

4. The combination defined in claim 3, wherein said sealing means comprise a groove in said radially outer surface surrounding said depression in spaced relation thereto, and a compressible seal in said groove.

5. The combination defined in claim 1, including recessed annular cage means mounted coaxial with said race member and containing said elements in individual recesses thereof with substantial lateral, angular and axial freedom of displacement within said recesses, first resilient means in the recesses of said cage means engaging sides of said elements, and second resilient means in said recesses separate and distinct from the first resilient means engaging opposite ends of said elements for at all times exerting light biasing forces tending to restore the elements to laterally, angularly and axially centered positions within their recesses parallel to the rotational axis of said rotatable member while the elements are rolling past the circumferential regions of the race member intermediate said three pressure-transmitting areas.

6. The combination with a rotatable member of an antifriction bearing device for supporting said member said device comprising a circumferential series of roller-like antifriction elements having their one sides rollingly engaging a peripheral surface of said member; a race member positioned coaxially with said rotatable member to have one surface thereof rollingly engaged by the opposite side of said elements; recessed annular cage means containing said elements in individual recesses thereof for free rotation in and limited angular, lateral and axial freedom of displacement said recesses and mounted coaxial with said race member for retaining the elements in engagement with said one surface of the race member; supporting structure including a circumferential surface coaxial with said race member and generally radially spaced from the opposite surface thereof to define an annular space therewith; means entirely contained within said annular space and defining first pressure-transmitting parts of limited arcuate extent between said supporting surface and said opposite surface of the race member, said parts being circumferentially spaced around said race member; a further pressure-transmitting part contained within said annular space and mounted for limited radial displacement therein towards and away from said race member; pressure means biasing said further pressure-transmitting part towards said race member, whereby on rotation of the rotatable member the anifriction elements will be subjected to pressure forces on rolling past said spaced pressure-transmitting parts and will be substantially free from pressure forces while rolling past intermediate circumferential regions of said one surface of the race member; first resilient means in the recesses of said cage means engaging sides of said antifriction elements for at all times applying thereto light lateral biasing forces and second resilient means separate and distinct from the first and engaging ends of said elements for applying thereto light axial biasing forces whereby said resilient means co-operates to restore the elements to laterally and axially centered positions within their recesses parallel to the axis of said rotatable member when rolling past said intermediate regions while permitting the elements to be displaced from such positions within their recesses when rolling past said pressure-transmitting parts.

7. The combination with a rotatable member of an antifriction bearing device for supporting said member comprising a circumferential series of roller-like antifriction elements having their one sides rollingly engaging a peripheral surface of said member; a race member positioned coaxially with said rotatable member to have one surface thereof rollingly engaged by the opposite side of said elements; recessed annular cage means containing said elements in individual recesses thereof for free rotation and limited angular, lateral and axial freedom of displacement in said recesses and mounted coaxial with said race member for retaining the elements in engagement with said one surface of the race member; supporting structure including a circumferential surface coaxial with said race member and generally radially spaced from the opposite surface thereof to define an annular space therewith; means defining three pressure-transmitting parts of limited arcuate extent between said supporting surface and said opposite surface of the race member, said parts being circumferentially spaced around said race member; means mounting one of said pressure-transmitting parts in the supporting structure for limited radial displacement towards and away from said race member; pressure means biasing said one pressure-transmitting part towards said race member, whereby on rotation of the rotatable member the antifriction elements will be subjected to pressure forces on rolling past said spaced pressure-transmitting parts and will be substantially free from pressure forces while rolling past intermediate circumferential regions of said one surface of the race member; first spring means in each recess of the cage means engaging a side of the related element for urging the element to a position substantial parallel to the rotational axis of the rotatable member; and second spring means in each recess engaging at least one end of said element for urging the element to an axially centered position in said recess, whereby said elements will be restored substantially to angularly, laterally and axially centered positions within their recesses on moving through said circumferential spaces intermediate the pressure-transmitting parts while being allowed to be displaced from said centered positions on moving past said pressure-transmitting areas.

8. The combination defined in claim 7, wherein said first resilient means in each recess is a hairpin-shaped wire spring having its free legs anchored in the cage means at one end of the bearing and having its looped end deflected to engage said side of the element at a point intermediate the length of the element.

9. The combination defined in claim 7, wherein said second resilient means include a pair of spring-pressed plungers mounted in each recess at the opposite ends of the cage means and engaging the opposite end surfaces of the related antifriction element.

References Cited by the Examiner
UNITED STATES PATENTS

| | | | |
|---|---|---|---|
| 1,141,675 | 6/15 | Yeakley | 308—217 |
| 1,785,617 | 12/30 | Cowburn | 208—184 X |
| 2,004,783 | 6/35 | Doran | 308—9 |
| 2,061,999 | 11/36 | Foss | 308—201 |
| 2,197,432 | 4/40 | Kingsbury | 308—9 X |
| 2,231,350 | 2/43 | Ringle | 208—218 |
| 2,869,942 | 1/59 | Volpin | 308—187.1 |
| 2,989,353 | 6/61 | Nyberg | 308—217 X |
| 3,009,748 | 11/61 | Pitner | 308—207 |

ROBERT C. RIORDON, *Primary Examiner.*

FRANK SUSKO, *Examiner.*